US010213628B1

(12) United States Patent
Cooper et al.

(10) Patent No.: US 10,213,628 B1
(45) Date of Patent: Feb. 26, 2019

(54) BELAY BRAKING SYSTEM

(71) Applicant: The United States of America, as represented by the Secretary of the Air Force, Washington, DC (US)

(72) Inventors: Cory Alan Cooper, Monument, CO (US); Darren Craig Tidwell, Huntsville, UT (US); Garrett Fritzsche, Monument, CO (US); Christopher Yooshin Jang, Colorado Springs, CO (US); Brock M. Flieger, Colorado Springs, CO (US); Alan James Vaillencourt, Cookeville, TN (US); Miranda Leigh Bray, Colorado Springs, CO (US); Shane Michael Riley, Sheppard AFB, TX (US); Nathanael Jordan Szuch, SAAFB, TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 40 days.

(21) Appl. No.: 15/489,116

(22) Filed: Apr. 17, 2017

(51) Int. Cl.
*A62B 1/06* (2006.01)
*B66D 3/10* (2006.01)
(Continued)

(52) U.S. Cl.
CPC ............... *A62B 1/06* (2013.01); *A62B 1/14* (2013.01); *A62B 35/0037* (2013.01); *B66D 3/10* (2013.01);
(Continued)

(58) Field of Classification Search
CPC .......... A62B 1/06; A62B 1/14; A62B 35/0037
See application file for complete search history.

(56) References Cited

U.S. PATENT DOCUMENTS

| 702,858 A | * | 6/1902 | Hendricks | .......... A62B 35/0025 |
| | | | | 182/6 |
| 1,372,853 A | * | 3/1921 | Wellen | ..................... A62B 1/14 |
| | | | | 188/65.2 |

(Continued)

FOREIGN PATENT DOCUMENTS

| CH | 641052 A5 | * | 2/1984 | ............... A62B 1/14 |
| DE | 2407770 A1 | * | 8/1975 | ............... A62B 1/14 |

(Continued)

OTHER PUBLICATIONS

Translation of DE 3037766.

*Primary Examiner* — Colleen M Chavchavadze
(74) *Attorney, Agent, or Firm* — AFMCLC/JAZ; Timothy Barlow

(57) ABSTRACT

A user-controllable braking system, including a descent tether connectable to a support and configurable for descending a user; a rigid body configured to be connectable between the descent tether and a user for enabling control of the descent by the user; a pulley rotatably positioned on the rigid body, the descent tether positionable around the pulley; a brake member yieldably positioned on the rigid body adjacent the pulley; a bias member operatively associated with the brake member to bias the brake member away from the pulley; and a lever pivotally connected to the rigid body and operable to bear against the brake member to controllably overcome the bias member and controllably bear the brake member against a portion of the descent tether. Operation of the lever by the user enables the user to controllably bear the brake member against the portion of the descent tether positioned around the pulley to provide a braking force.

14 Claims, 6 Drawing Sheets

(51) Int. Cl.
  *B66D 5/16*  (2006.01)
  *F16D 63/00*  (2006.01)
  *A62B 1/14*  (2006.01)
  *A62B 35/00*  (2006.01)
  *F16D 121/14*  (2012.01)
(52) U.S. Cl.
  CPC .............. *B66D 5/16* (2013.01); *F16D 63/008* (2013.01); *F16D 2121/14* (2013.01)

(56) References Cited

U.S. PATENT DOCUMENTS

| | | | | |
|---|---|---|---|---|
| 1,470,746 A * | 10/1923 | Johnson | ............. | A62B 1/06 182/191 |
| 1,671,527 A * | 5/1928 | Jones | ............. | A62B 1/14 182/7 |
| 1,766,566 A * | 6/1930 | Tucker | ............. | A62B 1/14 182/100 |
| 2,585,876 A * | 2/1952 | Thoennes | ............. | A62B 1/06 182/236 |
| 3,437,178 A * | 4/1969 | Postlethwait | ............. | A62B 1/14 182/5 |
| 3,703,218 A * | 11/1972 | Brda | ............. | A62B 1/14 182/13 |
| 3,799,287 A * | 3/1974 | Ledner | ............. | A62B 1/14 182/5 |
| 3,826,341 A * | 7/1974 | Ledner | ............. | A62B 1/14 182/5 |
| 3,938,620 A * | 2/1976 | Nothiger | ............. | A62B 1/14 182/135 |
| 4,054,183 A * | 10/1977 | Boniface | ............. | A62B 1/14 182/142 |
| 4,106,589 A * | 8/1978 | Petersen | ............. | A62B 1/06 182/5 |
| 4,399,889 A * | 8/1983 | Todd | ............. | A62B 1/14 182/193 |
| 4,494,629 A * | 1/1985 | Raeburn | ............. | A62B 1/14 182/7 |
| 4,515,240 A * | 5/1985 | Curtis | ............. | A62B 1/14 182/6 |
| 4,632,218 A * | 12/1986 | Hannan | ............. | A62B 1/14 182/5 |
| 4,645,034 A * | 2/1987 | Griffith | ............. | A62B 35/04 182/231 |
| 4,662,475 A * | 5/1987 | Rutschi | ............. | A62B 1/14 182/192 |
| 4,722,495 A | 2/1988 | Meredith | | |
| 5,058,706 A * | 10/1991 | Pai | ............. | A62B 1/14 182/5 |
| 5,127,490 A * | 7/1992 | Sheu | ............. | A62B 1/10 182/236 |
| 5,145,028 A * | 9/1992 | Wai | ............. | A62B 1/10 182/193 |
| 5,360,083 A | 11/1994 | Hede | | |

FOREIGN PATENT DOCUMENTS

| | | | | |
|---|---|---|---|---|
| DE | 3037766 | | 10/1980 | |
| DE | 3047284 A1 | * | 7/1982 | ............. A62B 1/14 |
| GB | 190920849 A | * | 2/1910 | ............. A62B 1/14 |
| GB | 1125774 A | * | 8/1968 | ............. A62B 1/14 |

* cited by examiner

BELAY BRAKING SYSTEM

GOVERNMENT INTEREST

The invention described herein may be manufactured and used by or for the Government of the United States for all governmental purposes without the payment of any royalty.

CROSS REFERENCE TO RELATED APPLICATIONS

None.

FIELD OF THE INVENTION

This invention relates to the field of braking devices for tethered descent. More particularly, this invention relates to user-controllable belay and braking systems for enabling a user suspended from a descent tether to control descent.

BACKGROUND OF THE INVENTION

Controlled descent is desired in many domains. The use of automatic belaying devices is commonly used for the controlled descent of humans in the sport of rock climbing. Automatic belaying devices are also utilized in first responder and military environments. While the automatic belaying devices provide a controlled descent, there is currently no way for the user to slow or halt the descent, as the belay device continues to feed out a descent tether.

What is needed, therefore, are user-controllable belay and braking systems suitable for enabling a user to control and even halt his descent from a support from which the user is descending.

SUMMARY OF THE INVENTION

The above and other needs are met by user-controllable belay and braking systems for enabling a user to control his descent from a support from which the user is descending.

In one aspect, the invention relates to a user-controllable braking system including a descent tether connectable to a support and configurable for descending a user; a rigid body configured to be connectable between the descent tether and a user for enabling control of the descent by the user; a pulley positioned on the rigid body, the descent tether positionable around the pulley; a brake member yieldably positioned on the rigid body adjacent the pulley; a bias member operatively associated with the brake member to bias the brake member away from the pulley; and a lever pivotally connected to the rigid body and operable to bear against the brake member to controllably overcome the bias member and controllably bear the brake member against a portion of the descent tether.

Operation of the lever by the user enables the user to controllably bear the brake member against the portion of the descent tether positioned around the pulley to provide a braking force regardless of the belay device.

In another aspect, the invention provides a user-controllable braking system including a rigid body configured to be connectable between the user and the descent tether; a pulley positioned on the rigid body and configured for receiving the descent tether when the braking system is in use; a brake member yieldably positioned adjacent the pulley; a bias member operatively associated with the brake member to bias the brake member away from the pulley; and a lever pivotally connected to the rigid body and operable by the user to bear against the brake member to controllably overcome the bias member and controllably bear the brake member toward the pulley.

Operation of the lever by the user enables the user to controllably bear the brake member toward the pulley to provide a user-controllable braking force for controlling descent of the user.

In a further aspect, the invention relates to a user-controllable belay system including a belay connectable to the support from which a user is to descend, the belay having a belay tether configured to feed out the belay tether during descent of the user from the support; and a user controllable braking system operatively connectable between the belay tether of the belay and the user.

The braking system includes a rigid body; a pulley rotatably positioned on the rigid body, the belay tether positionable around the pulley; a brake member yieldably positioned adjacent the pulley; a bias member operatively associated with the brake member to bias the brake member away from the pulley; and a lever pivotally connected to the rigid body and operable by the user to bear against the brake member to controllably overcome the bias member and controllably bear the brake member against a portion of the belay tether.

Operation of the lever by the user enables the user to controllably bear the brake member against the portion of the belay tether positioned around the pulley to provide a user controllable braking force for controlling descent of the user.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
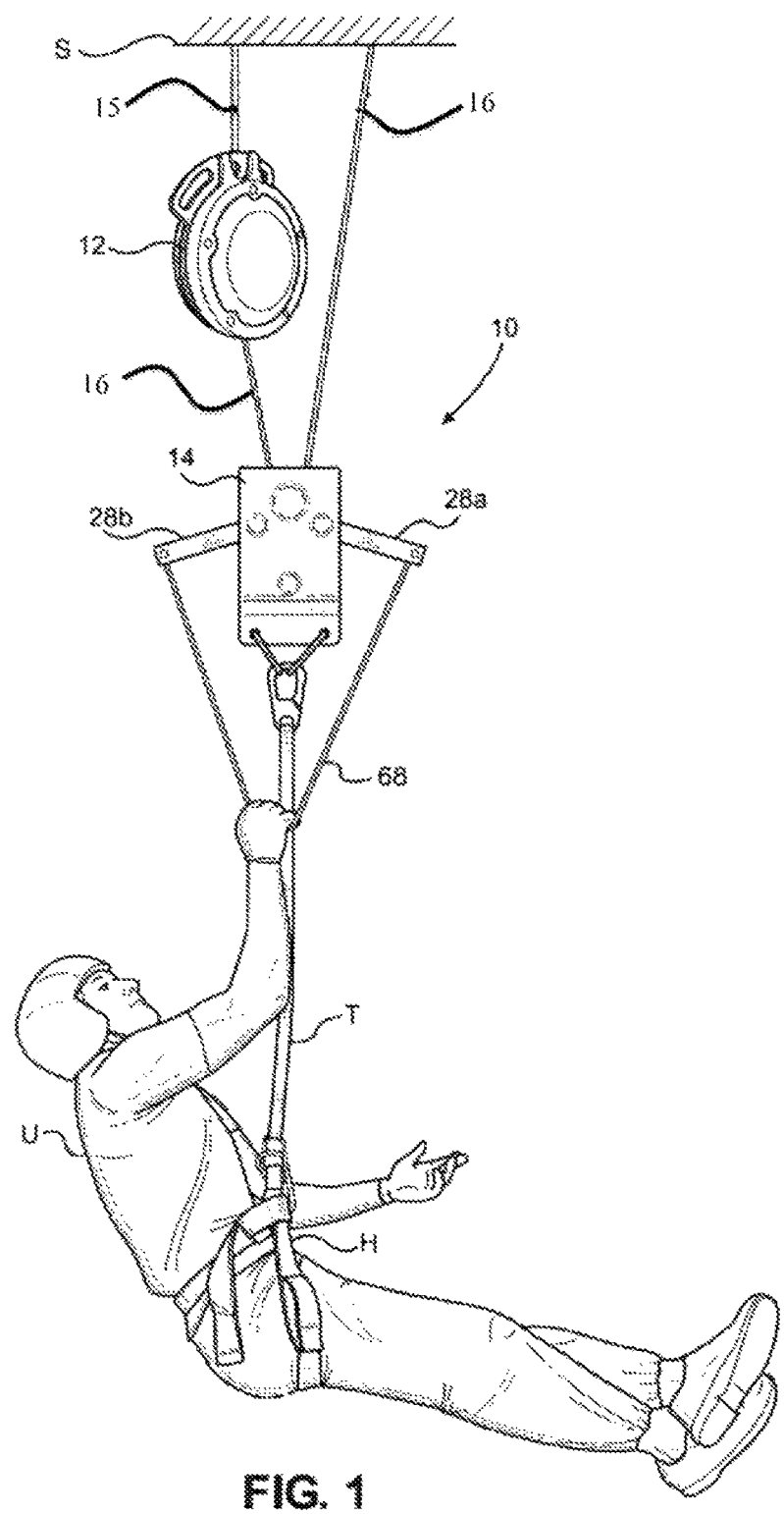
FIG. 1 depicts a user-controllable belay system according to an embodiment of the invention.

With reference to the drawings, and particularly FIG. 1, there is shown a user-controllable belay system 10 according to the invention. The belay system 10 is desirably configured to enable a user U to control descent from a support S from which the user U is descending.

The system 10 is configured to be suitable for a variety of environments, such as military, first responder, or recreational. The support S may be a building structure, an aircraft, or a natural structure such as a mountain ledge.

The belay system 10 includes a belay 12 and a user controllable braking system 14. The belay 12 is connectable to the support S from which the user U is to descend. The braking system 14 is configured to enable the user U to apply braking force for controlling descent. The braking system 14 is operatively connectable between a descent or belay tether 15, 16 of the belay 12 and the user U. For example, the user U may wear a harness H, with a user tether T connecting to the braking system 14.

The belay 12 is configured to feed out the belay tether 16 during descent of the user U from the support S. The belay 12 may take the form of a variety of belay devices and may be a conventional belay configured to store the belay tether 16 on an internal reel and automatically feed out the belay tether 16 to descend the user U at a generally constant rate. The belay tether 16 is desirably a flat webbing, but may be round such as a rope or cable or the like, or of other cross-sectional configurations.

Figure 2:
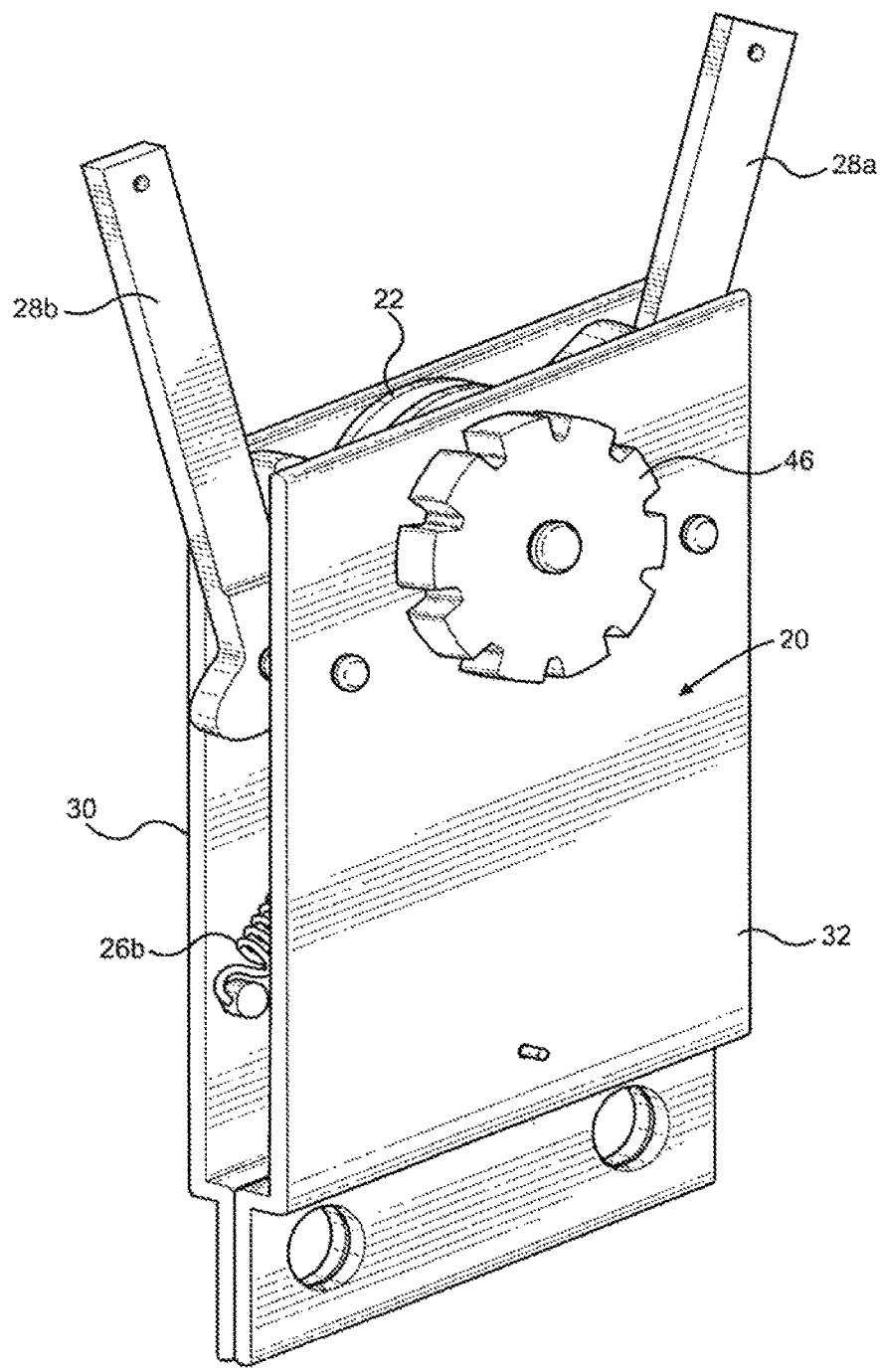
FIG. 2 presents a perspective view of an embodiment of a braking system which may be utilized in the belay system of FIG. 1.
Figure 3:
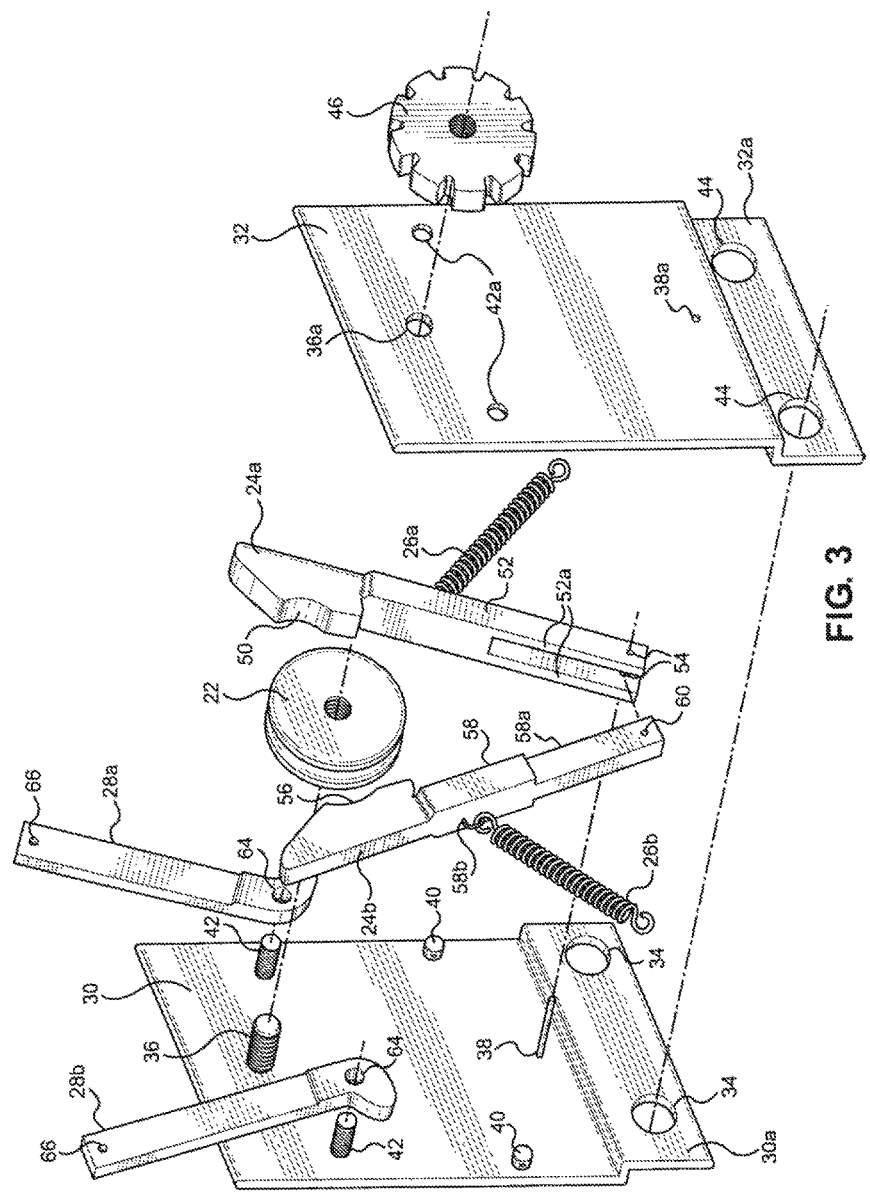
FIG. 3 presents an exploded view of the braking system of FIG. 2.

The braking system 14 cooperates with the belay tether 16 and enables the user U to slow the speed of descent or to even halt descent even if the tether 16 continues to be fed from the belay 12. As depicted in FIGS. 2 and 3, the braking system 14 includes a rigid body 20, a pulley 22, brake members 24a and 24b, bias members 26a and 26b, and levers 28a and 28b.

The rigid body 20 provides a support for the pulley 22 and may be a single piece but is preferably provided as by a pair of rigid plates 30 and 32. Plate 30 may be generally rectangular with a lower indented portion 30a. The indented portion 30a may include apertures 34 to facilitate attachment of the tether T to the braking system 14. The plate 30 includes a pulley mount 36, brake member mount 38, bias member mounts 40, and lever mounts 42.

Plate 32 preferably has the same or complementary shape as the plate 30 with a lower indented portion 32a and including apertures 44 corresponding to the apertures 34 of the plate 30. To assemble the rigid body 20 as made with the rigid plates 30 and 32, the indented portions 30a and 32a are placed in abutting relationship so that the remaining portions of the plates 30 and 32 are spaced apart to provide a housing into which the pulley 20, brake members 24a and 24b, bias members 26a and 26b, and levers 28 are located.

The plate 32 includes apertures 36a, 38a, and 42a which correspond in location to the mounts 36, 38, and 42, and receive the ends thereof. The mount 36 is desirably threaded at its end and extends through the plate 32 as assembled with the plate 30 (see FIG. 2). An enlarged easy to grip nut 46 is threadably received by the mount 36 to secure the plates 30 and 32 together. The nut 46 is easily manipulated without tools to enable the plate 32 to be easily removed for installation of the belay tether 16 on the pulley 22, and then reinstalled.

The pulley 22 may comprise a grooved wheel or other conventional pulley structure rotatably positioned on the rigid body 20. The pulley 22 may be a static structure as well, and may be provided by a pin or the pulley mount 36. That is, the pulley 22 will be understood to be a structure that supports movement and change of direction of the belay tether 16.

The brake member 24a is configured to have a brake surface 50 and a leg 52 depending from the brake surface 50. A lower portion of the leg 52 has a central potion thereof removed to provide spaced apart leg portions 52a. A connector 52b is provided on the leg 52 for connecting the bias member 26a to the leg 52. Aligned apertures 54 are provided through the leg portions 52a to receive the mount 38.

The brake member 24b is configured to have a brake surface 56 and a leg 58 depending from the brake surface 56. A lower portion of the leg 58 has a reduced dimension central portion 58a configured to be received by the spaced apart leg portions 52a of the leg 52. A connector 58b is provided on the leg 58 for connecting the bias member 26b to the leg 58. Aperture 60 is provided through the central portion 58a for receiving the mount 38.

The bias members 26a and 26b may be provided as by springs, rubber bands, or other elastic or elastomer members. The bias members 26a and 26b are mounted to the mounts 40 and the brake members 24a and 24b, respectively. The bias members 26a and 26b serve to bias the brake members 24a and 24b in a direction away from the pulley 22 so that braking force is not applied unless the user acts on the levers 28a and 28b to overcome the bias members 24a and 24b to enable the brake members 24a and 24b to be moved toward the pulley 22. As described more fully below in connection with FIGS. 4-6, the amount of braking force applied is proportional to the force applied by the user U to the levers 28a and 28b, and no braking force is applied until sufficient force is applied by the user U to extend the bias members 24a and 24b.

The lever 28a is an elongated rigid member having a lobed end 62 configured for interfacing with the brake member 24a for urging the brake member 24a toward the pulley 22 based upon the force exerted on the lever 28a by the user U. The lever 28a may be a straight bar or other simple geometry, but the provision of the lobed end 62 is preferred for smooth application of force to facilitate infinitesimal adjustment of the degree of braking force applied. The lever 28a includes an aperture 64 for receiving the lever mount 42 to pivotally mount the lever 28a to the plate 30. The opposite free end of the lever 28a includes an aperture 66 for attachment of a line 68 (see FIG. 1) or the like thereto to facilitate the user U acting on the lever 28a.

The lever 28b may be identical to the lever 28a, and is configured for interfacing with the brake member 24b for urging the brake member 24b toward the pulley 22 depending upon the force exerted on the lever 28b by the user U. The lever 28b likewise includes lobed end 62, aperture 64, and aperture 66.

Figure 4:
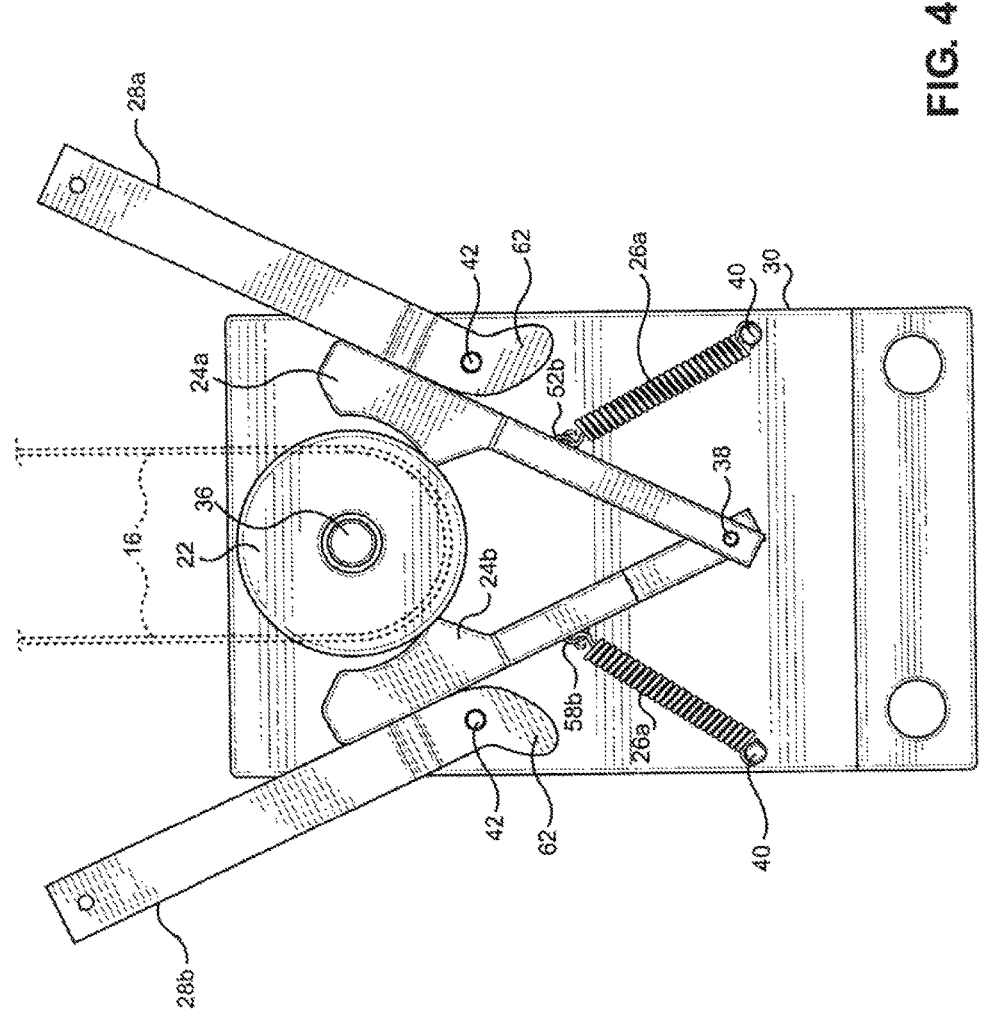
FIG. 4 depicts the braking system of FIG. 2 with a belay tether installed thereon and having brake members thereof oriented to apply no braking force.

The braking system 14 may be assembled by:
a. installing the pulley 22 onto the mount 26;
b. placing the reduced dimension central portion 58a of the leg 58 between the spaced apart leg portions 52a of the leg 52 so that the apertures 54 and 60 are aligned, and sliding the apertures 54 and 60 onto the mount 38 with the brake members 24a and 24b adjacent the edges of the pulley 22;
c. installing the bias members 26a and 26b on the mounts 40 and the connectors 52b and 58b, respectively;
d. installing the levers 28a and 28b on the lever mounts 42 with the lengths thereof parallel with the brake members 26a and 26b and opposite the pulley 22, as seen in FIG. 4; and
e. installing the plate 32 onto the plate 30 and securing in place using the nut 46.

To install the braking system 14 onto the belay tether 16, the nut 46 is easily manipulated without tools to enable the plate 32 to be easily removed for installation of the belay tether 16 on the pulley 22, and then reinstalled.

Figure 5:
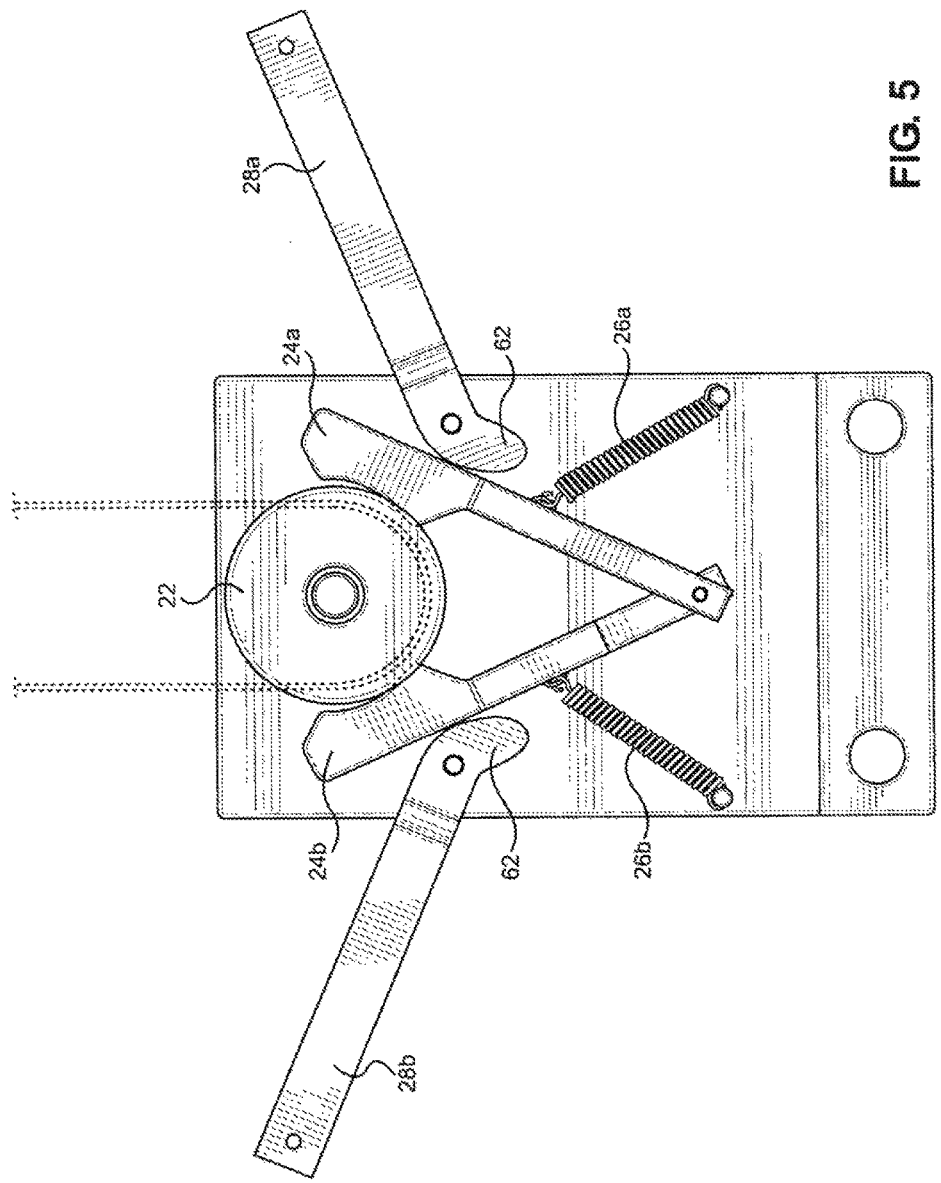
FIG. 5 depicts the braking system of FIG. 2 with a belay tether installed thereon and having brake members thereof oriented to apply a partial braking force to slow descent.
Figure 6:
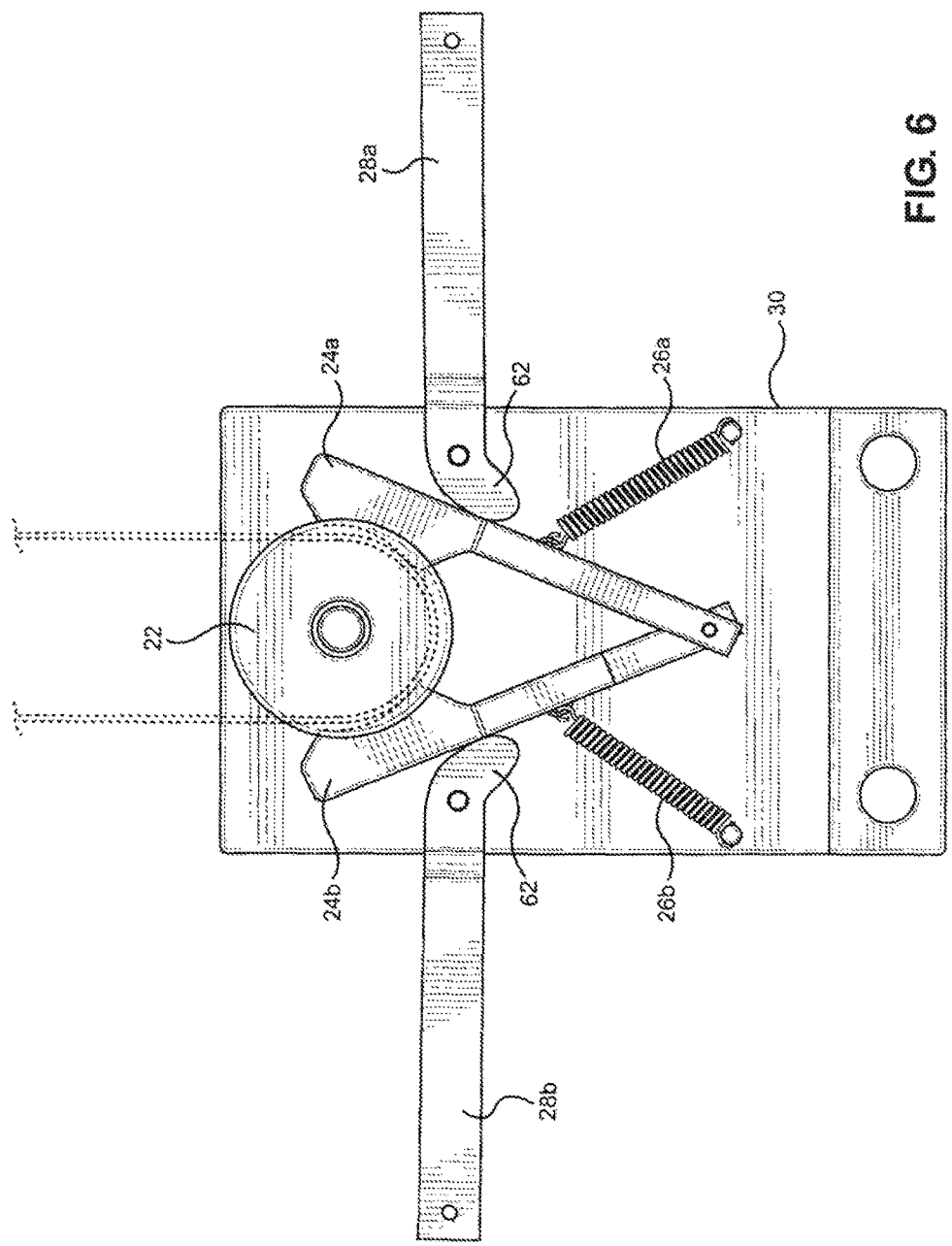
FIG. 6 depicts the braking system of FIG. 2 with a belay tether installed thereon and having brake members thereof oriented to apply a full braking force to halt descent.

With reference to FIGS. 4-6, it will be seen that operation of the levers 28a and 28b by the user U enables the user U to controllably bear the brake members 24a and 24b against the portion of the belay tether 16 positioned around the pulley 22 to provide a user controllable braking force for controlling descent of the user U.

FIG. 4 depicts the braking system 14 with the belay tether 16 installed thereon and having the brake members 24a and 24b oriented to apply no braking force. This corresponds to descent conditions in which the user U is not applying any force to the levers 28a and 28b.

FIG. 5 depicts the braking system 14 with the levers 28a and 28b oriented to correspond to application of a partial braking force. This corresponds to descent conditions in which the user U is applying a force to the levers 28a and 28b sufficient to bear the bias members 24a and 24b against the tether 16 to decrease the rate of travel of the tether 16 relative to the pulley 22 and slow the rate of descent. The user U may apply varying degrees of force to infinitesimally adjust the degree of force applied by the levers 28a and 28b to adjust the decrease of the rate of descent.

FIG. 6 depicts the braking system 14 with the levers 28a and 28b oriented to correspond to application of a full braking force. This corresponds to conditions in which the user U has fully extended the bias members 26a and 26b to fully bear the bias members 24a and 24b against the belay tether 16 and the pulley 22 to lock the belay tether 16 to the pulley 22 and stop descent.

Accordingly, it will be appreciated that the invention provides user-controllable belay and braking systems for enabling a user to control and even halt descent from a support from which the user is descending.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A user-controllable braking system, the braking system consisting of:
a descent tether connectable to a support and configurable for descending a user;
a rigid body configured to be connectable between the descent tether and the user for enabling control of the descent by the user;
a single pulley positioned on the rigid body, the descent tether positionable around the pulley;
a first brake member yieldably positioned on the rigid body adjacent a first side of the pulley;
a second brake member yieldably positioned on the rigid body adjacent a second side of the pulley;
a first bias member operatively associated with the first brake member to bias the first brake member away from the pulley;
a second bias member operatively associated with the second brake member to bias the second brake member away from the pulley;
a first lever pivotally connected to the rigid body and operable to bear against the first brake member to controllably overcome the first bias member and controllably bear the first brake member against a first portion of the descent tether;
a second lever pivotally connected to the rigid body and operable to bear against the second brake member to controllably overcome the second bias member and controllably bear the second brake member against a second portion of the descent tether; and
a line couples to the first lever and the second lever,
wherein operation of the first and second levers by the user enables the user to controllably bear the first and second brake members against the first and second portions of the descent tether positioned around the pulley to provide a braking force.

2. The braking system of claim 1, wherein the pulley is rotatably positioned on the rigid body.

3. The braking system of claim 1, wherein the descent tether comprises a flat webbing.

4. The braking system of claim 1, wherein the rigid body comprises a housing having opposite sidewalls having a space therebetween.

5. The braking system of claim 1, wherein the bias member comprises a spring or an elastomer.

6. A user-controllable braking system for enabling a user suspended from a descent tether to control descent, the brake consisting of:
a rigid body configured to be connectable between the user and the descent tether;
a single pulley positioned on the rigid body and configured for receiving the descent tether when the braking system is in use;
a first brake member yieldably positioned adjacent a first side of the pulley;
a second brake member yieldably positioned adjacent a second side of the pulley;
a first bias member operatively associated with the first brake member to bias the first brake member away from the pulley;
second bias member operatively associated with the second brake member to bias the second brake member away from the pulley;
a first lever pivotally connected to the rigid body and operable by the user to bear against the first brake member to controllably overcome the first bias member and controllably bear the first brake member toward the pulley; and
a second lever pivotally connected to the rigid body and operable by the user to bear against the second brake member to controllably overcome the second bias member and controllably bear the second brake member toward the pulley;
a line coupled to the first lever and the second lever,
wherein operation of the first and second levers by the user enables the user to controllably bear the first and second brake members against the first and second portions of the descent tether that are around the pulley to provide a user-controllable braking force for controlling descent of the user.

7. The braking system of claim 6, wherein the pulley is rotatably positioned on the rigid body.

8. The braking system of claim 6, wherein the rigid body comprises a housing having opposite sidewalls having a space therebetween.

9. The braking system of claim 6, wherein the bias member comprises a spring or an elastomer.

10. A user-controllable belay system for enabling a user to control descent from a support from which a user is descending, the belay system comprising:

a belay connectable to the support from which the user is to descend, the belay having a belay tether configured to feed out the belay tether during descent of the user from the support; and a user controllable braking system operatively connectable between the belay tether of the belay and the user, the braking system consisting of:

a rigid body;

a single pulley rotatably positioned on the rigid body, the belay tether positionable around the pulley;

a first brake member yieldably positioned adjacent a first side of the pulley;

a second brake member yieldably positioned adjacent a second side of the pulley;

a first bias member operatively associated with the first brake member to bias the first brake member away from the pulley;

a second bias member operatively associated with the second brake member to bias the second brake member away from the pulley;

a first lever pivotally connected to the rigid body and operable by the user to bear against the first brake member to controllably overcome the first bias member and controllably bear the first brake member against a first portion of the belay tether;

a second lever pivotally connected to the rigid body and operable by the user to bear against the second brake member to controllably overcome the second bias member and controllably bear the second brake member against a second portion of the belay tether; and a line coupled to the first and second levers, wherein operation of the first and second levers by the user enables the user to controllably bear the first and second brake members against the first and second portions of the belay tether positioned around the pulley to provide a user controllable braking force for controlling descent of the user.

11. The system of claim 10, wherein the tether comprises a flat webbing.

12. The braking system of claim 10, wherein the rigid body comprises a housing having opposite sidewalls having a space therebetween.

13. The braking system of claim 10, wherein the bias member comprises a spring.

14. The braking system of claim 10, wherein the bias member comprises an elastomer.

* * * * *